United States Patent
Neustifter

(10) Patent No.: US 8,893,583 B2
(45) Date of Patent: Nov. 25, 2014

(54) METHOD FOR MODIFYING A TRANSFER CASE FOR A PLURALITY OF OUTPUTS

(76) Inventor: Johann Neustifter, Allhaming (AT)

( * ) Notice: Subject to any disclaimer, the term of this patent is extended or adjusted under 35 U.S.C. 154(b) by 222 days.

(21) Appl. No.: 13/375,911

(22) PCT Filed: Jun. 4, 2010

(86) PCT No.: PCT/AT2010/000196
§ 371 (c)(1),
(2), (4) Date: Dec. 30, 2011

(87) PCT Pub. No.: WO2010/138985
PCT Pub. Date: Dec. 9, 2010

(65) Prior Publication Data
US 2012/0103133 A1    May 3, 2012

(30) Foreign Application Priority Data
Jun. 4, 2009   (AT) .............................. GM344/2009

(51) Int. Cl.
*F16H 37/06* (2006.01)
*F16H 57/022* (2012.01)

(52) U.S. Cl.
CPC ...... *F16H 57/022* (2013.01); *F16H 2057/0224* (2013.01)
USPC ........................................ 74/665 F; 74/665 G

(58) Field of Classification Search
USPC ............................................ 74/665 F, 665 G
See application file for complete search history.

(56) References Cited

U.S. PATENT DOCUMENTS

| | | | | |
|---|---|---|---|---|
| 5,458,533 A | * | 10/1995 | Barth et al. ................... | 451/357 |
| 5,472,384 A | * | 12/1995 | Haga ............................. | 475/162 |
| 6,981,478 B2 | * | 1/2006 | Schafer et al. ............ | 123/90.17 |
| 7,188,700 B2 | * | 3/2007 | Eda et al. ...................... | 180/444 |
| 7,614,976 B2 | * | 11/2009 | Smook et al. ................. | 475/331 |
| 7,772,731 B2 | * | 8/2010 | Abe et al. ........................ | 310/83 |
| 2008/0224553 A1 | * | 9/2008 | Abe et al. ........................ | 310/71 |

FOREIGN PATENT DOCUMENTS

| | | |
|---|---|---|
| CA | 9004800 | 6/1990 |
| DE | 38 41 016 | 6/1990 |
| JP | 61 007650 | 1/1986 |

OTHER PUBLICATIONS

International Search Report of PCT/AT2010/00196, date of mailing Sep. 29, 2010.

* cited by examiner

*Primary Examiner* — Ha D Ho
(74) *Attorney, Agent, or Firm* — Collard & Roe, P.C.

(57) ABSTRACT

A method is described for modifying a transfer case for a plurality of outputs, which are connected to a common drivetrain via intermediate gear wheels (3, 4), whose bearing housing (7) receives the axially removable wheel axles (6), the individual outputs being decoupled from the common drivetrain and being connected to individual drives. To provide simple modification conditions, it is proposed that the wheel axle (6) of at least one intermediate gear wheel (3, 4) in the drive connection between the respective output and the common drivetrain be replaced by an adjusting axle (8), which is preferably eccentrically mounted in bearing covers (11) via eccentric frontal journals (10), before the intermediate gear wheel (3, 4) is pivoted out of engagement by rotating the adjusting axle (8) around the frontal journals (10).

3 Claims, 2 Drawing Sheets

METHOD FOR MODIFYING A TRANSFER CASE FOR A PLURALITY OF OUTPUTS

CROSS REFERENCE TO RELATED APPLICATIONS

This application is the National Stage of PCT/AT2010/000196 filed on Jun. 4, 2010, which claims priority under 35 U.S.C. §119 of Austrian Application No. GM 344/2009 filed on Jun. 4, 2009. The international application under PCT article 21(2) was not published in English.

FIELD OF THE INVENTION

A method is proposed for modifying a transfer case for a plurality of outputs, which are connected to a common drivetrain via intermediate gear wheels, whose bearing housing receives the axially removable wheel axles, the individual outputs being decoupled from the common drivetrain and connected to individual drives.

DESCRIPTION OF THE PRIOR ART

In order to drive a plurality of machine components, for example, rollers or drums of a drying group of a paper machine, in a predefined speed ratio, providing transfer cases having corresponding outputs for the individual machine components is known. These outputs are connected via intermediate gear wheels to a common drivetrain. These transfer cases, which are heavy because of the typically rough drive conditions, have the primary disadvantage that they are subject to comparatively high wear and cause long shutdown times in the event of a tooth or bearing fracture. Therefore, such transfer cases are being abandoned more and more and replaced by individual drives, particularly because the controller of such individual drives is entirely capable of ensuring the required speed ratios with sufficient precision. While the use of individual drives does not cause any difficulties in new facilities, a substantial expenditure results in the case of the modification of existing transfer gears, for connecting the individual outputs to corresponding individual drives, because the intermediate gear wheels connecting the respective outputs to the common drivetrain must be removed, which requires substantial disassembly of the transfer gear and frequently further facility parts in the case of large transfer gears. In addition, there is a danger of consequential damages, because leaks may result through the removal and installation of gear parts.

SUMMARY OF THE INVENTION

The invention is therefore based on the problem of implementing a method for modifying a transfer case for a plurality of outputs so that the expenditure for the modification of the transfer case to individual drives can be substantially reduced and consequential damages can be avoided.

Proceeding from a method of the type mentioned at the beginning for modifying a transfer case for a plurality of outputs, the invention solves the stated problem in that the wheel axle of at least one intermediate gear wheel in the drive connection between the respective output and the common drivetrain is replaced by an adjusting axle, which is preferably mounted eccentrically in bearing covers via eccentric frontal journals, before the intermediate gear wheel is disengaged by rotating the adjusting axle around the frontal journals.

With the replacement of the wheel axles of the intermediate gear wheel, which is to be disengaged from adjacent gear wheels, by adjusting axles, which are mounted so they are rotationally adjustable eccentrically in bearing covers of the bearing housing, an advantageous condition is provided for the purpose of being able to disengage the teeth of the respective intermediate gear wheels, without having to remove these intermediate gear wheels, because, due to the eccentric mounting of the adjusting axles, the intermediate gear wheels can be pivoted on these adjusting axles to disengage the respective tooth engagement using the eccentricity of the adjusting axle mounting as the pivot radius around the eccentric frontal journals of the adjusting axles. Therefore, complex disassembly of the transfer case or further facility parts is not necessary in order to impinge the individual outputs of the transfer case not via the common drivetrain, but rather via individual drives. Therefore, for the required interruption of the drive connection between outputs and the common drivetrain, only the wheel axles of the intermediate gear wheels to be removed from the drive connection are to be axially withdrawn from their bearing housings and replaced by corresponding adjusting axles, bearing covers being provided to receive the adjusting axles. If comparatively small adjustment distances are required for the disengagement of the respective tooth engagement, the eccentric frontal journals of the adjusting axles could be centrally received in the bearing covers. In general, however, greater adjusting distances for the displacement of the intermediate gear wheels to interrupt the drive connection are desirable, so that an eccentric mounting of the frontal journals of the adjusting axles in the bearing covers is preferred. By rotating the adjusting axles, which are held eccentrically in the bearing covers, the intermediate gear wheels seated thereon are removed from the tooth engagement with an adjacent gear wheel. The intermediate gear wheel which is removed from the drive connection can remain in the transfer case, so that disassembly of the transfer case to remove these intermediate gear wheels is superfluous.

In order that it can be ensured that an intermediate gear wheel removed from the drive connection is not unintentionally displaced into an engagement position, the adjusting axles can be fixed in the rotational location for the disengaged position of the respective intermediate gear wheels.

Therefore, to modify the outputs of a transfer case, which are connected to a common drivetrain, for individual drives, only a simple installation set is necessary, which is distinguished by an adjusting axle, which replaces the wheel axle of at least one intermediate gear wheel in the drive connection between the respective output and the common drivetrain, and which is mounted so it is adjustable via eccentric frontal journals in bearing covers of the bearing housing. With the aid of such installation sets, complex transfer cases for a plurality of outputs may therefore be prepared in a simple way so that the individual outputs can be connected to individual drives. The eccentrically mounted adjusting axles not only permit decoupling of the respective gear wheel, but rather also allow the setting of the tooth flank play if needed. Special load conditions can therefore advantageously be taken into consideration.

BRIEF DESCRIPTION OF THE DRAWING

The method according to the invention for modifying a transfer case for a plurality of outputs will be explained in greater detail on the basis of the drawing. In the figures.

DESCRIPTION OF THE PREFERRED EMBODIMENT

Figure 1:
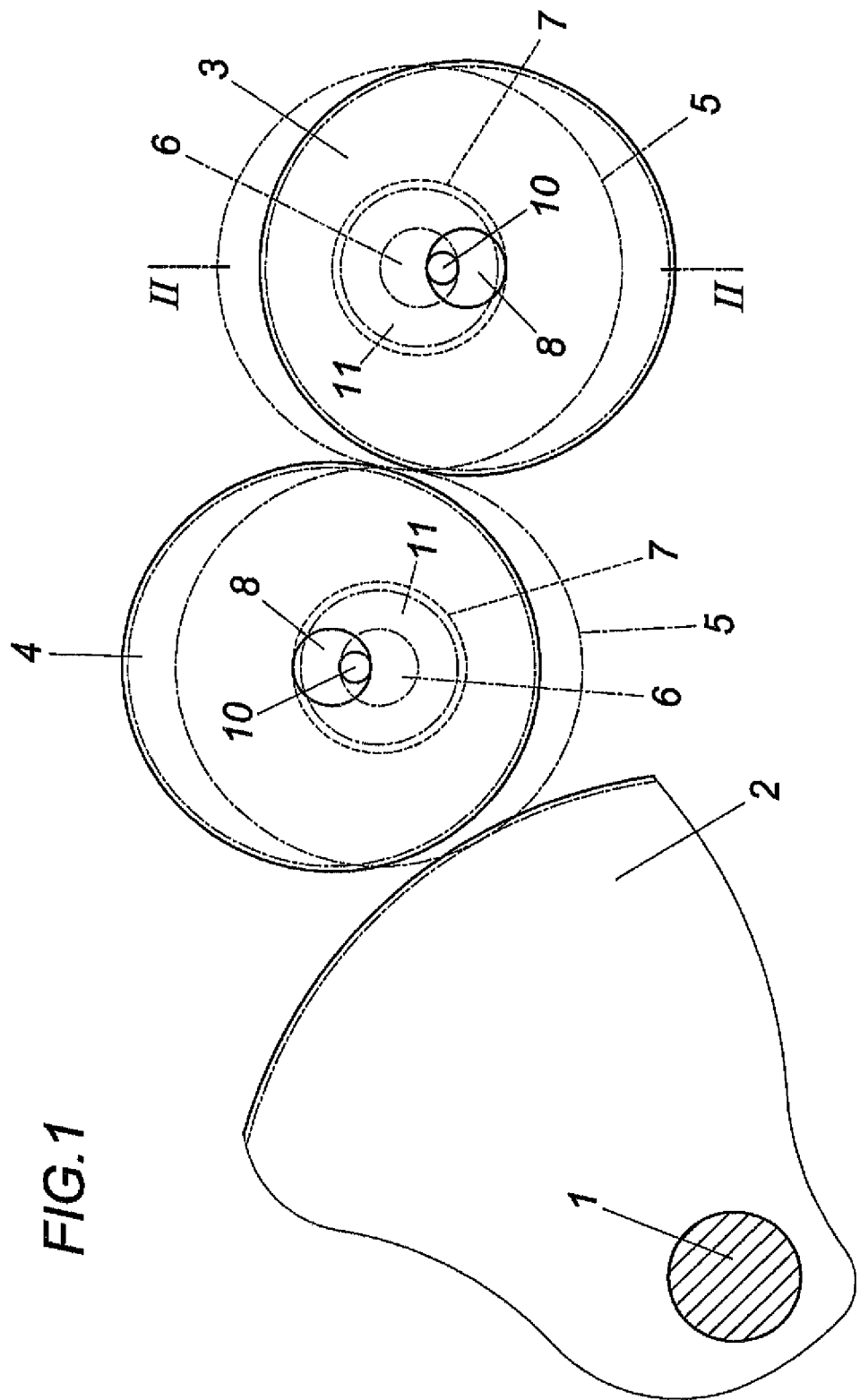
FIG. 1 shows a drive connection for an output of a transfer case via two intermediate gear wheels in a simplified side view and FIG. 2 shows a section along line II-II of FIG. 1 in an enlarged scale.

According to FIG. 1, one of the outputs of a transfer case (not shown in greater detail) is formed by the output shaft 1 of a gear wheel 2, which is driven by a common drivetrain of the transfer case via two intermediate gear wheels 3 and 4. The engagement positions are illustrated via the reference circles 5, which are indicated by dot-dash lines, of the intermediate gear wheels 3, 4. In these engagement positions, the wheel axles 6, which are indicated by dot-dash lines, run coaxially to the bearing housings 7, which are indicated by dashed lines in FIG. 1, receiving the gear axles 6.

Figure 2:
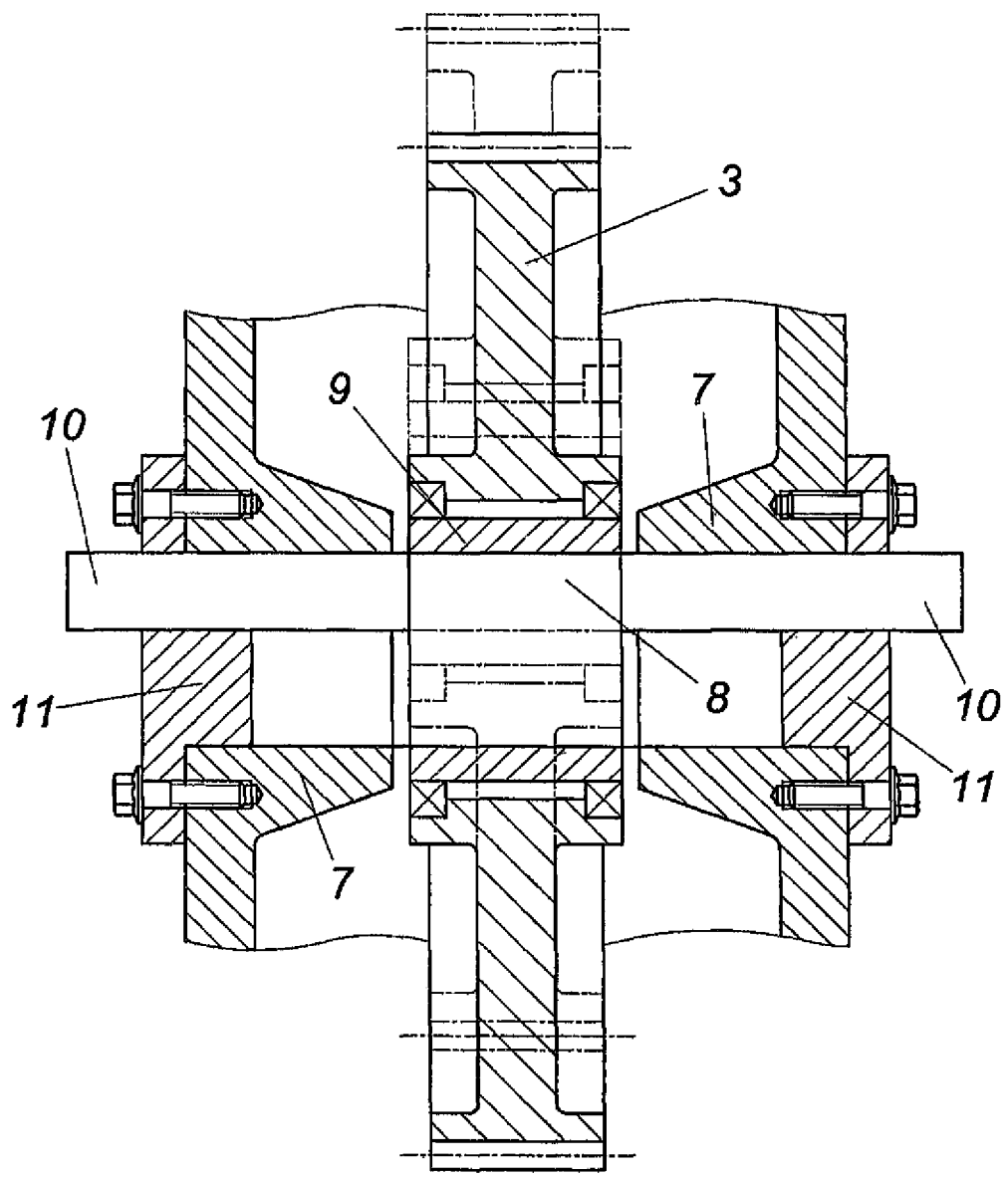

In order to disengage the drive connection of the gear wheel 2 for the output via the intermediate gear wheels 3, 4, the wheel axles 6 of these intermediate gear wheels 3, 4 are withdrawn in the axial direction and replaced by adjusting axles 8. As can be inferred from FIG. 2, the intermediate gear wheels 3 and 4 are mounted so they are rotatable on a sleeve 9, which is initially penetrated by the wheel axle 6 and then by the adjusting axle 8, which has a diameter corresponding to the wheel axle 6 and can be inserted coaxially through the bearing housing 7 to receive the sleeve 9. In contrast to the wheel axle 6, however, the adjusting axle 8 has two eccentric frontal journals 10, which are held so they are rotatable eccentrically in bearing covers 11 of the bearing housing 7. After the replacement of the wheel axle 6 by the adjusting axle 8, the respective intermediate gear wheel 3, 4 is therefore supported via the eccentric frontal journals 10 in the bearing covers 11, as shown by solid lines in FIG. 2. If the adjusting axle 8 is now pivoted via the eccentric frontal journals 10, the respective intermediate gear wheel 3, 4 is also pivoted and is disengaged from the tooth engagement of the adjacent gear wheels. The pivoted position of the intermediate gear wheel 3 having the radial displacement because of the eccentricity of the frontal journals 10 is shown by dot-dash lines in FIG. 2.

FIG. 1 shows that upon a rotation of the adjusting axle 8 around the frontal journals 10, which are eccentrically mounted in the bearing covers 11, into the rotated position shown by solid lines, the intermediate gear wheels 3, 4 are removed from the tooth engagement with the respective adjacent gear wheels, whereby the drive connection to the gear wheel 2 and therefore to the output shaft 1 is interrupted. The output shaft 1 can accordingly be driven without difficulties via an individual drive independently of the common drivetrain of the transfer case. The weight of the intermediate gear wheels 3, 4 merely has to be borne on the bearing cover 11 via the frontal journals 10, so that the reduction of the diameter of the eccentric frontal journals 10 required in comparison to the wheel axle 6 does not play a role for the load absorption.

To fix the disengaged location of the intermediate gear wheels 3 and 4 shown by solid lines in FIG. 1, the frontal journals 10 of the adjusting axle 8 can be fixed in a rotationally fixed manner in relation to the bearing covers 11.

Of course, the invention is not restricted to the illustrated exemplary embodiment. Thus, for example, the eccentric displacement of the adjusting axle 8 could also be used for the purpose of setting the flank play of the associated gear wheel.

The invention claimed is:

1. A method for modifying a transfer case for a plurality of outputs, which are connected to a common drivetrain via intermediate gear wheels, each intermediate gear wheel having a bearing housing that receives an axially removable wheel axle, individual outputs being decoupled from the common drivetrain and being connected to individual drives, wherein the wheel axle of at least one intermediate gear wheel in the drive connection between the respective output and the common drivetrain is replaced by an adjusting axle, which is preferably eccentrically mounted in bearing covers via eccentric frontal journals, before the intermediate gear wheel is pivoted out of engagement by rotating the adjusting axle around the frontal journals.

2. The method according to claim 1, wherein the adjusting axle is fixed in a rotational location for the disengagement of the respective intermediate gear wheels.

3. An installation set for modifying a transfer case for a plurality of outputs, which are connected to a common drivetrain via intermediate gear wheels, whose bearing housing receives axially removable wheel axles, comprising an adjusting axle, which replaces a wheel axle of at least one intermediate gear wheel in the drive connection between the respective output and the common drivetrain, and which is mounted so the adjusting axle is eccentrically adjustable in bearing covers of the bearing housing via eccentric frontal journals, wherein the at least one intermediate gear wheel is movable between an engagement position and an out-of-engagement position using the eccentrically mounted adjusting axle.

* * * * *